Sept. 15, 1931.  W. R. KNAPP  1,823,364
PROCESS FOR THE ELIMINATION OF WASTE LIQUORS AND THE RECOVERY
OF AMMONIUM SALTS AND PHENOLS FROM SAID LIQUORS
Filed Dec. 2, 1926  2 Sheets-Sheet 1
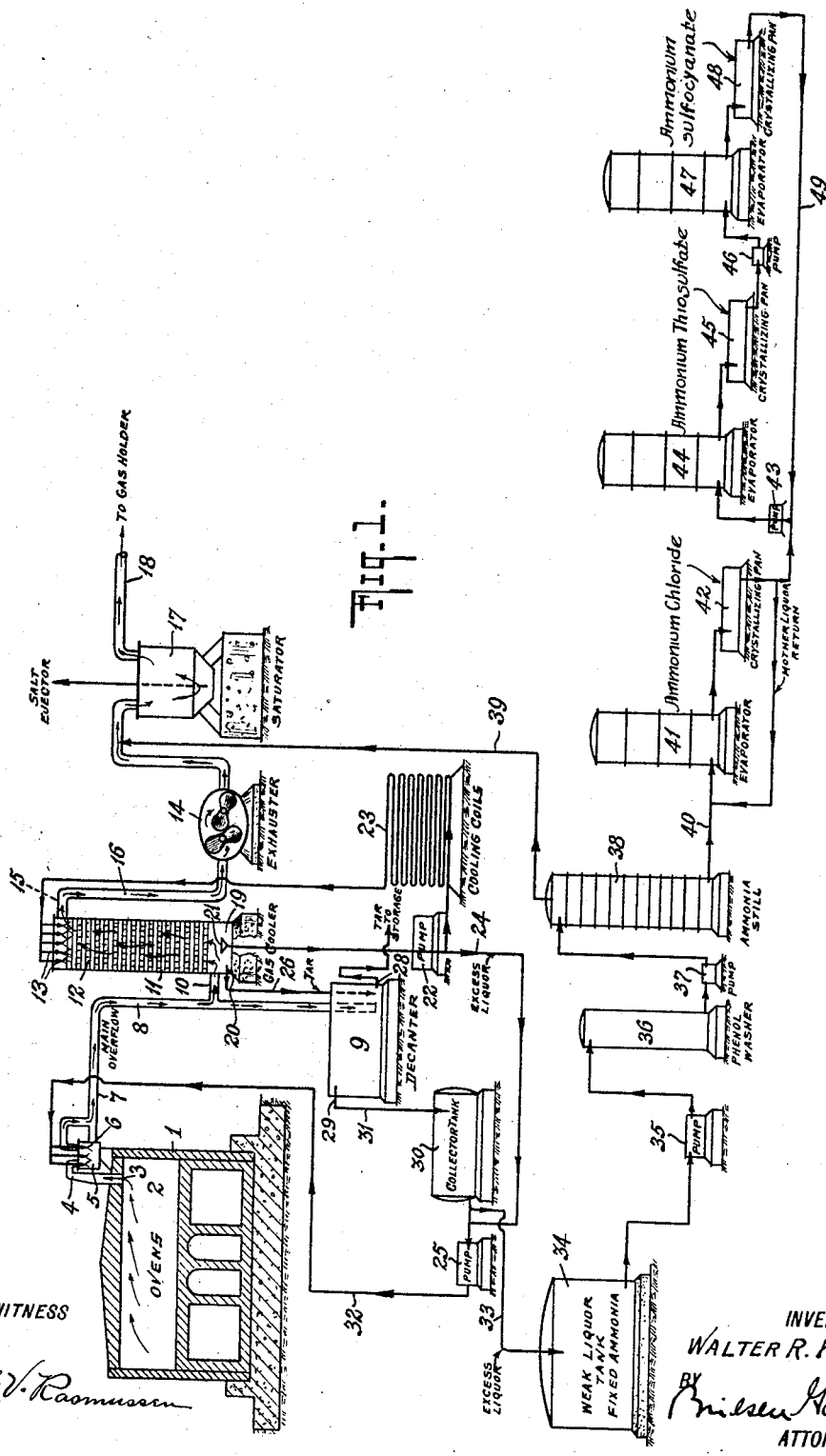

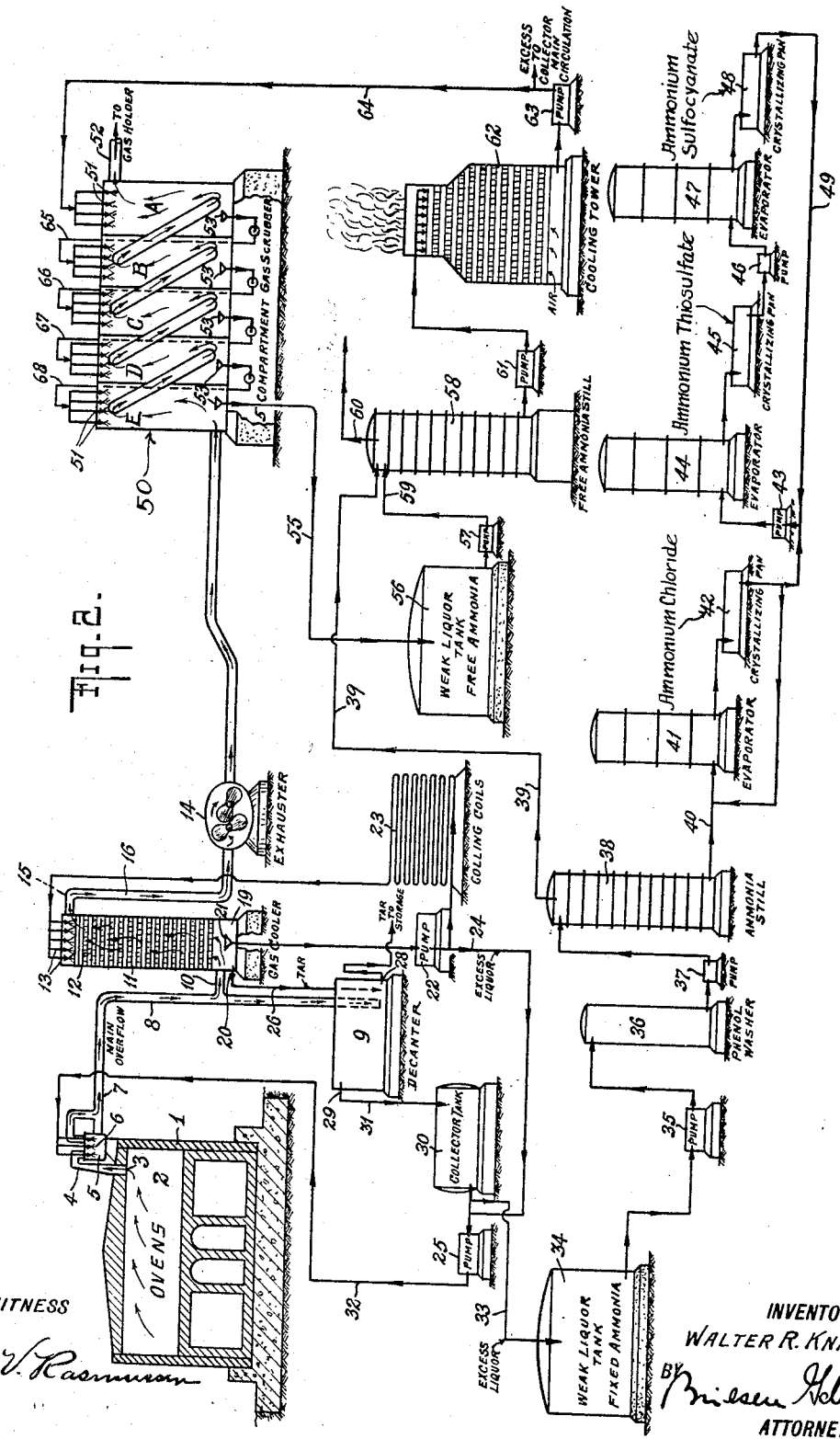

Patented Sept. 15, 1931

1,823,364

UNITED STATES PATENT OFFICE

WALTER R. KNAPP, OF PELHAM MANOR, NEW YORK, ASSIGNOR TO SEMET-SOLVAY COMPANY, OF NEW YORK, N. Y., A CORPORATION OF NEW YORK

PROCESS FOR THE ELIMINATION OF WASTE LIQUORS AND THE RECOVERY OF AMMONIUM SALTS AND PHENOLS FROM SAID LIQUORS

Application filed December 2, 1926. Serial No. 152,146.

This invention relates to coal carbonization plants and more particularly to by-product coke oven systems and to a process of dealing with the distillates of the coke ovens in such a manner as to avoid the discharge into any streams or waters of any material detrimental to vegetable or animal life, such as ammonia still wastes or the like, and incidentally to the aforesaid process recovering various valuable products.

In the operation of coal carbonization plants the by-product distillates are generally scrubbed and the liquor treated for ammonia recovery. The waste liquor from such ammonia stills is usually discharged directly into public waterways or indirectly through sewage systems. The waste liquor contains several deleterious substances which, although greatly diluted, ultimately pollute and contaminate the waterways and render such water unpalatable for human consumption and even unfit for many industrial and household purposes. This pollution of streams and waters of a country is detrimental to the public health as well as to the flora and fauna associated with the waterways.

Various proposals have been suggested in order to remove some of the deleterious substances before liquors are permitted to be discharged. After the removal of some such substances, the remaining liquor, however, still containing other objectionable substances, was usually discharged into public waters. None of the proposals so far as I am aware have succeeded in entirely eliminating the pollution and contamination of water courses and the like with waste liquors from coal carbonization plants.

According to my new method, I am able to eliminate entirely discharging anything detrimental into public waters. My invention also contemplates recovering from the waste liquors valuable products, such as phenols and various ammonium salts, so that my method of eliminating the aforesaid waste liquors may be operated in a practical, economical, and commercial manner.

The invention will be best understood from the following description of a preferred mode of procedure taken in conjunction with the drawings in which Fig. 1 shows a diagrammatic view of a part of a coal carbonization plant having incorporated therein my system for the elimination of waste liquors and the recovery therefrom of by-products; and Fig. 2 shows a view similar to Fig. 1 of a modified system.

In the drawings, the numeral 1 designates generally any well known by-product coke oven having a coking chamber 2 which has a gas off-take port 3 in the upper part thereof. An up-take pipe 4 connects gas off-take port 3 to a collector main 5 which is supplied by a plurality of sprays 6 with weak liquor for scrubbing and cooling the products of distillation from the coke oven. The moisture contained in the distillation products condenses in the weak liquor and substantially counterbalances any diminution of the circulating weak liquor due to withdrawals, losses, etc., thereby dispensing with the necessity for the introduction of fresh circulation water into the system. The weak liquor collecting in the collector main 5 may or may not seal the end of the up-take pipe in any well known manner, and when the liquor level rises above the level of the overflow pipe 7 the liquor flows to a decanter 9 via pipes 7 and 8. The gaseous distillation products likewise flow through pipes 7 and 8 but leave the latter pipe through an off-take pipe 10 which leads to a gas cooler 11. This cooler is filled with suitable packing material 12 which causes an intimate mixing with cool weak liquor from sprays 13 and the gaseous distillation products from off-take pipe 10. The gas rising through the cooler 11 is sucked therefrom by any approved exhauster 14 through outlet 15 and conduit 16. From the exhauster the gas flows to a saturator 17 which, as is well known, removes and fixes any free ammonia and allows the ammonia-free gas to pass off to a gas holder (not shown) or to any other point desired through pipe 18.

The liquor flowing downwardly in cooler 11 collects at the base 19 thereof where the liquid stratifies into two layers, the upper one containing weak liquor and the lower one containing tar. The weak liquor discharges through outlet 21 to a circulating pump 22 which forces the liquor through cooling coils 23 and thence back to the sprays 13 in gas cooler 12. Any excess weak liquor not needed in the gas cooler system passes off through pipe line 24 to the inlet of pump 25, which circulates the liquor through the collector main system. This circulating liquor contains various compounds of ammonia which are preferably maintained at approximately the following concentrations: free ammonia including carbonates and sulphides not over 1.00 gram per liter, ammonia present as ammonium chloride 40.00 grams per liter, ammonia present as thiosulphate 9.63 grams per liter, and ammonia present as sulphocyanate 5.37 grams per liter. The tar accumulating in base 19 discharges through outlet 20 and pipe 26 to the lower part of decanter 9. In this decanter the weak liquor and tar separate into two layers, the lower layer containing the heavy tar which leaves the decanter via outlet 28 to the tar storage (not shown), and the upper layer containing the light weak liquor which discharges from the decanter via outlet 29. The latter outlet is connected to a collector tank 30 by a pipe line 31. This tank serves as a reservoir for the weak liquor used in the collector main for scrubbing the gas passing through the main. Pump 25 maintains a circulation in the collector main system consisting of a pipe line 32, feeding sprays 6, a collector main extending from one end of the battery to the other, overflow line 7, conduit 8, decanter 9, and collector tank 30. The gas collector main circulation liquor is kept at as high a concentration with respect to the substances to be recovered as possible, the concentration of ammonium chloride, for example, being preferably maintained at about 40 to 50 grams per liter, although this concentration may be varied without interfering with the operation of the process. A small portion of this liquor is bled from the system via pipe line 33 and is sent to a storage tank 34. This tank feeds my recovery system in which phenol, pyridine, naphthalene, and various ammonia salts are recovered.

In my recovery system the weak liquor is first pumped by pump 35 to a phenol washer 36 where it is treated with benzol in a well known manner so as to remove phenol, pyridine and naphthalene. A preferred procedure for operating the phenol washer system is described in my co-pending application, Serial No. 154,012, filed December 10, 1926 whereby phenols and pyridine are separately recoverable at this point of the system. The phenol-free liquor is then pumped by pump 37 to a still 38 which removes any free ammonia contained in the liquor and sends the evolved ammonia to the saturator 17 through line 39. The liquor leaves the still through line 40 which conveys it to a evaporator 41 preferably of the vacuum type. This evaporator concentrates the liquor and discharges the concentrated liquor into a crystallizing pan where ammonium chloride crystallizes from the mother liquor. The ammonium salt is recovered and the mother liquor is returned to evaporator 41 where it is mixed with another batch of weak liquor for concentration. This procedure is repeated until the concentrations of ammonium thiosulphate and ammonium sulphocyanate are sufficiently high, preferably 300 grams per liter, to permit recovery of these salts. When the desired concentration has been reached, the mother liquor from crystallizing pan 42 is pumped via pump 43 to evaporator 44. Concentration of the liquor is continued in evaporator 44 until the next salt is ready to crystallize from solution when the liquor is discharged into crystallizing pan 45. After crystallization is completed the mother liquor is removed from pan 45, leaving the crop of crystals of ammonium thiosulphate. The mother liquor is pumped by pump 46 to the next evaporator 47 which concentrates the liquor until the next batch of crystals are ready to precipitate. The concentrated liquor in evaporator 47 is then discharged into crystallizing pan 48 where crystallization of ammonium sulphocyanate occurs. The procedure of withdrawing the mother liquor from the crystals is repeated and the withdrawn liquor is returned to evaporator 44 via return line 49. The returned mother liquor is recirculated through evaporators 44 and 47 with fresh liquor from pan 42. The evaporators have capacity sufficient to accommodate the feed supplied to them by pipe 40, and are operated and regulated so that there is a balance between the evaporation and the flow of the feed and the recirculated liquor to the evaporator system, whereby the various salts are recovered at their respective pans and a circulation of mother liquor is maintained in the salt recovery system. If it is desired, any of the recovered salts can be further purified by any of the well known methods. In the aforesaid manner, the waste liquors are absolutely eliminated and ammonium salts, pyridine, naphthalene, and phenols are recovered therefrom as by-products.

The modified system shown in Fig. 2 is similar to that shown in Fig. 1, except the saturator 17 is replaced by a gas scrubber which removes the free ammonia as ammonia liquor in place of ammonium sulphate as in the saturator. Since the gas scrubber system is the only modification to the system described heretofore, the following description will be limited thereto. The gas from exhauster 14 is blown through a tortuous path in gas scrubber 50. This scrubber is shown with five compartments, although it is obvious the number of compartments and even the type of scrubber can be varied according to the particular circumstances. In passing through the scrubber the gas is thoroughly washed with the ammonia-freed liquor or effluent from the ammonia still 58 which is first cooled in a cooling tower 62 and is then pumped to the scrubber by means of pump 63 and pipe line 64. This pipe line is connected with a plurality of sprays 51 positioned in the upper part of compartment A of the scrubber so that the liquor flow is counter-current to the gas flow. The scrubbing liquor leaves compartment A via outlet 53 and is then pumped by suitable means through pipe line 65 to sprays 51 in compartment B. After contacting with the gas in compartment B the liquor flows out via outlet 53 and then passes through pipe line 66 to compartment C. The aforesaid operations are repeated in compartments C, D, and E, so that the scrubbing liquor is progressively concentrated with respect to ammonia. The washed gas leaves the scrubber via outlet 52 in compartment A, and the liquor containing the ammonia washed from the gas flows out through outlet 53 in compartment E. This outlet leads to a main discharge line 55 which conveys the ammonia liquor to a storage tank 56. A pump 57 withdraws the liquor from tank 56 and forces it through line 59 into the top of still 58 adjacent to an inlet pipe 39 carrying vapors from still 38. In this still the free ammonia in the weak liquor, as well as the vapors from still 38, is removed therefrom and is driven off through outlet 60, which is connected to ammonia condensers (not shown) of any well known type adapted to recover the ammonia liquor or to any other ammonia treating apparatus or to any point desired. The ammonia-freed liquor in still 58 is removed as noted heretofore, by pump 61 which feeds the top of a suitable cooling tower 62. Air, as is well known, flows upwardly through the tower and cools the downflowing liquid. The cooled effluent is collected in the bottom portion of the tower and is returned to sprays 51 by means of pump 63 and return line 64. By the foregoing procedure the gas from the by-product coke ovens is thoroughly washed of its free ammonia which is recovered as ammonia liquor in the present instance, and is completely freed of its other concomitants (which but for their removal would constitute impurities in the ammonia still effluent) in such a manner that phenols, pyridine, naphthalene, ammonia liquor, ammonium sulphate, ammonium chloride, thiosulphate and sulphocyanate are recoverable as valuable by-products and all waste liquors are completely consumed in and eliminated from the system.

It will be observed that in the preferred forms of my improved process, instead of having one ammonia liquor recovery system as heretofore, there are two separate recovery systems. The one system comprises the gas collector or hydraulic main on the battery of ovens and the gas cooler or primary condensers with all the related auxiliaries; and the other system comprises ammonia gas scrubbers or the direct sulphate saturator with their related auxiliaries.

I claim:

1. The process of eliminating waste liquors from a coal carbonization plant and recovering products therefrom which comprises scrubbing the products of distillation evolved in the carbonization of coal with an aqueous medium which is recirculated to scrub the distillation products, removing tar from the scrubbing liquor during its recirculation, removing excess scrubbing liquor treating the tar-freed scrubbing liquor thus removed with benzol to extract benzol-solubles contained in said liquor, feeding the said tar-freed liquor to an evaporator system, and regulating the evaporation in said system to balance the feed to and the recirculation in said system, whereby salts are successively recovered and a circulation of mother liquor is maintained in the evaporator system.

2. The process of treating coke oven distillates from a coal carbonization plant and recovering products therefrom which comprises the following steps: (1) scrubbing coal distillates by passing them in contact with a continuously circulating stream of liquor; (2) continuously withdrawing a portion of the scrubbing liquor from step (1); (3) circulating said portion of liquor into contact with the coal distillates prior to subjecting said distillates to the scrubbing operation of step (1); (4) removing tar from said liquor of step (3) during the circulation of said liquor; (5) withdrawing the excess tar free liquor from step (3); (6) treating the excess liquor with benzol to remove benzol solubles therefrom; (7) recovering free ammonia in the excess liquor by distilling the liquor; and (8) recovering the remaining ingredients of the liquor of step (3) by evaporating said liquor.

In testimony whereof I have hereunto set my hand.

WALTER R. KNAPP.